(12) United States Patent
Park et al.

(10) Patent No.: US 10,165,349 B2
(45) Date of Patent: Dec. 25, 2018

(54) AUDIO OUTPUT DEVICE AND ELECTRONIC DEVICE CONNECTED THEREWITH

(71) Applicant: Samsung Electronics Co., Ltd., Gyeonggi-do (KR)

(72) Inventors: Byung Lyul Park, Gyeonggi-do (KR); Kang Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 15/411,382

(22) Filed: Jan. 20, 2017

(65) Prior Publication Data
US 2017/0208383 A1  Jul. 20, 2017

(30) Foreign Application Priority Data
Jan. 20, 2016 (KR) .......... 10-2016-0006876

(51) Int. Cl.
*H04R 1/10* (2006.01)
*H01B 7/17* (2006.01)
*G06F 3/16* (2006.01)

(52) U.S. Cl.
CPC ........... *H04R 1/1041* (2013.01); *G06F 3/165* (2013.01); *H01B 7/17* (2013.01); *H04R 1/1016* (2013.01); *H04R 1/1033* (2013.01)

(58) Field of Classification Search
CPC .. H04R 1/1041; H04R 1/1016; H04R 1/1033; H04R 2225/61; H04R 2420/01; H01B 7/17; G06F 3/165
See application file for complete search history.

(56) References Cited

U.S. PATENT DOCUMENTS

| | | | |
|---|---|---|---|
| 6,989,679 B2* | 1/2006 | Lieder | G01B 7/023 324/658 |
| 7,925,039 B1* | 4/2011 | Griffin | H04R 29/00 345/161 |
| 9,503,802 B2* | 11/2016 | Kann | G06F 3/01 |
| 2007/0237170 A1* | 10/2007 | Proctor | H04R 1/1033 370/462 |
| 2010/0172618 A1* | 7/2010 | Lapp | H01B 7/32 385/101 |
| 2010/0211353 A1* | 8/2010 | Volckers | G01B 7/003 702/158 |

(Continued)

FOREIGN PATENT DOCUMENTS

| | | | | |
|---|---|---|---|---|
| EP | 2403270 B1 * | 3/2013 | .......... | H04R 1/1041 |
| KR | 20080041048 | 5/2008 | | |
| WO | WO 2007069001 A1 * | 6/2007 | .......... | H04M 1/6058 |

*Primary Examiner* — Curtis Kuntz
*Assistant Examiner* — Kuassi Ganmavo
(74) *Attorney, Agent, or Firm* — The Farrell Law Firm, P.C.

(57) ABSTRACT

An audio output device and an electronic device are provided. The audio output device includes a plurality of speakers, a terminal connected with a sound source providing device, and a cable connecting the plurality of speakers and the terminal. The cable includes a wire, a flexible element arranged surrounding a portion of the wire, and an insulation member forming an outer sheath of the cable. The flexible element includes a first flexible electrode and a second flexible electrode, and a capacitance of the flexible element changes as the flexible element is deformed.

10 Claims, 11 Drawing Sheets

(56) References Cited

U.S. PATENT DOCUMENTS

2011/0285554 A1\* 11/2011 Aghaei ................ G06F 3/0219
  341/33
2014/0254819 A1\* 9/2014 Yeates .................. H01H 9/0228
  381/74

\* cited by examiner

AUDIO OUTPUT DEVICE AND ELECTRONIC DEVICE CONNECTED THEREWITH

PRIORITY

This application claims priority under 35 U.S.C. § 119(a) to Korean Patent Application Serial No. 10-2016-0006876, which was filed in the Korean Intellectual Property Office on Jan. 20, 2016, the entire disclosure of which is incorporated herein by reference.

BACKGROUND

1. Field of the Disclosure

The present disclosure relates generally to a technology for controlling an electronic device, and more particularly, to controlling an electronic device by using an audio output device.

2. Description of the Related Art

An electronic device, such as a smartphone or a tablet personal computer (PC), may output audio signals through an audio output device, such as headphones or an earphone, connected with the electronic device. For example, the audio output device may include a controller that controls the electronic device connected therewith.

A conventional audio output device often includes a column type controller that includes a plurality of plastic buttons. However, a user of the conventional audio output device has to find a desired button of the controller by using a haptic feeling and then press the button to use the controller. Further, the column type controller hampers an aesthetic aspect of the audio output device.

SUMMARY

The present disclosure is made to address at least the above-mentioned problems and/or disadvantages and to provide at least the advantages described below.

Accordingly, an aspect of the present disclosure is to provide an audio output device that includes a controller at a location that may be easily recognized by a user and having an excellent aesthetic aspect, and a sound source providing device that may be controlled using the audio output device.

In accordance with an aspect of the present disclosure, an audio output device is provided, which includes a plurality of speakers; a terminal electrically connected with a sound source providing device; and a cable connecting the plurality of speakers and the terminal, wherein the cable comprises: a wire; a flexible element surrounding a portion of the wire; and an insulation member forming an outer sheath of the cable, wherein the flexible element comprises: a first flexible electrode; and a second flexible electrode, and wherein a capacitance of the flexible element changes as the flexible element is deformed.

In accordance with another aspect of the present disclosure, an audio output device is provided, which includes a plurality of speakers; a cable comprising: a wire that is electrically connected with the plurality of speakers; a flexible element that surrounds a portion of the wire; and an insulation member that forms an outer sheath of the cable; a capacitance measurement circuit electrically connected with the flexible element and configured to measure a capacitance of the flexible element; and a communication module configured to transmit the capacitance measured by the capacitance measurement circuit to a sound source providing device, wherein the flexible element comprises: a first flexible electrode; and a second flexible electrode, and wherein the capacitance of the flexible element changes as the flexible element is deformed.

In accordance with another aspect of the present disclosure, an electronic device is provided, which includes a receptacle configured to receive a terminal of an audio output device including a flexible element; a capacitance measurement circuit configured to measure a capacitance of the flexible element that is electrically connected with the capacitance measurement circuit through the receptacle; and a processor configured to obtain the capacitance that changes as a shape of the flexible element changes, using the capacitance measurement circuit, and to execute a function mapped with the capacitance.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
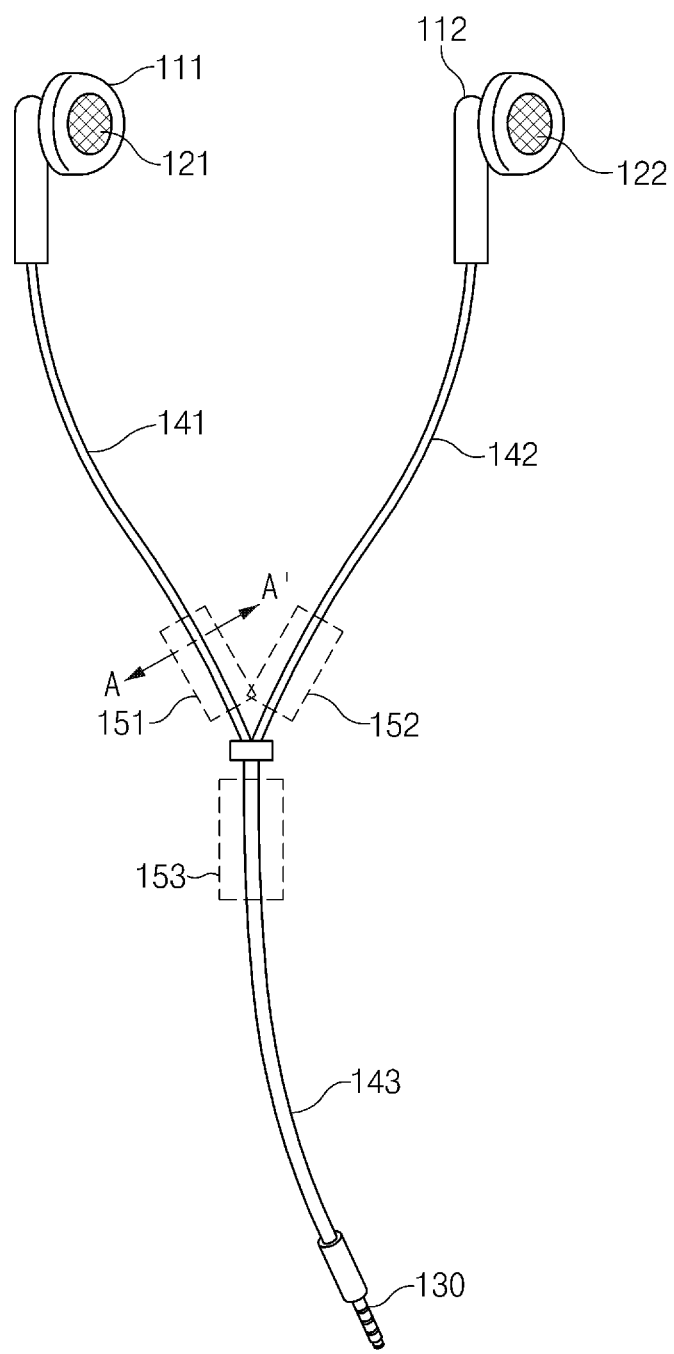
FIG. 1 illustrates an audio output device according to an embodiment of the present disclosure.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure.

With regard to description of drawings, the same or similar elements, features, structures, and/or components may be marked by similar reference numerals.

Terms used herein to describe specified embodiments of the present disclosure are not intended to limit the scope of the present disclosure. The terms of a singular form may include plural forms unless otherwise specified. Unless otherwise defined herein, all the terms used herein, which include technical or scientific terms, may have the same meanings that are generally understood by a person skilled in the art. Terms that are defined in a dictionary and commonly used, should also be interpreted as is customary in the relevant related art and not in an idealized or overly formal way, unless expressly defined as such herein. In some cases, even if terms are defined in the specification, they may not be interpreted to exclude embodiments of the present disclosure.

Herein, the expressions "have", "may have", "include", "comprise", "may include", and "may comprise" indicate the existence of corresponding features (e.g., elements such as numeric values, functions, operations, and/or components) but do not exclude the presence of additional features.

The expressions "A or B", "at least one of A or/and B", "one or more of A or/and B", etc., may include any and all combinations of one or more of the associated listed items. For example, the term "A or B", "at least one of A and B", or "at least one of A or B" may refer to (1) at least one A is included, (2) at least one B is included, or (3) both of at least one A and at least one B are included.

Numerical terms, such as "first", "second", etc., used herein may refer to various elements of various embodiments of the present disclosure, but do not limit the elements. For example, such terms are used only to distinguish one element from another element and do not limit the order and/or priority of the elements. For example, a first user device and a second user device may represent different user devices irrespective of sequence or importance. Accordingly, a first element may be referred to as a second element, and similarly, a second element may be referred to as a first element.

When an element (e.g., a first element) is referred to as being "(operatively or communicatively) coupled with/to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, no intervening element is present.

According to context, the expression "configured to" may be interchangeably used with "suitable for", "having the capacity to", "designed to", "adapted to", "made to", or "capable of". The term "configured to" does not necessarily mean "specifically designed to" in hardware. Instead, the expression "a device configured to" may mean that the device is "capable of" operating together with another device or other components.

A "processor configured to perform A, B, and C" may mean a dedicated processor (e.g., an embedded processor) for performing a corresponding operation or a generic-purpose processor (e.g., a central processing unit (CPU) or an application processor) that may perform corresponding operations by executing one or more software programs that are stored in a memory device.

An electronic device according to an embodiment of the present disclosure may include a smartphone, a tablet PC, a mobile phone, a video telephone, an electronic book reader, a desktop PC, a laptop PC, a netbook computer, a workstation, a server, a personal digital assistant (PDA), a portable multimedia player (PMP), an MP3 player, a mobile medical device, a camera, and a wearable device. For example, the wearable device may include an accessory (e.g., a watch, a ring, a bracelet, an ankle bracelet, glasses, a contact lens, or a head-mounted device (HMD)), a cloth-integrated type of device (e.g., electronic clothes), a body-attached type of device (e.g., a skin pads or a tattoo), or an implantable type of device (e.g., an implantable circuit).

An electronic device may also be a home appliance, e.g., a digital video disk (DVD) player, an audio player, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., XboX™ or PlayStation™), an electronic dictionary, an electronic key, a camcorder, or an electronic panel.

An electronic device may also be a medical device (e.g., a portable medical measurement device, such as a blood glucose meter, a heart rate measuring device, a blood pressure measuring device, and a body temperature measuring device, a magnetic resonance angiography (MRA) device, a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, an electronic device for a vessel (e.g., a navigation device for a vessel and a gyro compass), avionics, a security device, a vehicular head unit, an industrial or home robot, an automatic teller machine (ATM), a point of sales (POS) device, or an Internet of things (IoT) device (e.g., a light bulb, a sensor, an electricity or gas meter, a spring cooler device, a fire alarm device, a thermostat, an electric pole, a toaster, a sporting apparatus, a hot water tank, a heater, and a boiler).

An electronic device may also include furniture or a part of a building/structure, an electronic board, an electronic signature receiving device, a projector, or a measurement device (e.g., a water service, electricity, gas, or electric wave measuring device).

An electronic device may be a flexible device.

An electronic device may also be a combination of the aforementioned devices.

Further, an electronic device according to an embodiment of the present disclosure is not limited to the aforementioned devices, and may include new electronic devices produced due to the development of technologies.

Herein, the term "user" may refer to a person who uses an electronic device or may refer to a device (e.g., an artificial intelligence electronic device) that uses an electronic device.

FIG. 1 illustrates an audio output device according to an embodiment of the present disclosure.

Referring to FIG. 1, the audio output device includes housings 111 and 112, speakers 121 and 122, a terminal 130, and cables 141, 142, and 143.

The audio output device may be electrically connected with a sound source providing device (e.g., an electronic device such as a smartphone or a tablet PC). The audio output device may output a sound that is provided from the sound source providing device. The audio output device may include a flexible element for controlling the sound source providing device. Although FIG. 1 illustrates that the audio output device as an earphone, the present disclosure is not limited thereto and the audio output device may be one of various audio output devices such as a headphone.

The housings 111 and 112 are configured to be inserted into the ears of a user. For example, the housings 111 and 112 may be respectively inserted into a left ear and a right ear of the user.

The speakers 121 and 122 are arranged within the housings 111 and 112, respectively. Accordingly, if the housings 111 and 112 are inserted into the ears of the user, the speakers 121 and 122 may output a sound to the ears of the user.

The speakers 121 and 122 may convert an audio signal that is received from the sound source providing device to a sound. Alternatively, the speakers 121 and 122 may include a plurality of speakers arranged within the housing 111 and a plurality of speakers arranged within the housing 112.

The terminal 130 may be connected with a sound source providing device. The terminal 130 may be a connector or a plug that may be inserted into a socket or receptacle provided in the sound source providing device. For example, the terminal 130 may be a plug that may be inserted into a 3.5π jack, an m-USB (micro-USB) port, or a USB-C (USB 3.1 type-C) port.

The cables 141, 142, and 143 electrically connect the speakers 121 and 122 and the terminal 130. Each of the cables 141, 142, and 143 may include a wire that delivers an electrical signal and an insulation member that forms an outer sheath that surrounds the wire. The cable 141 that includes a wire, one end of which is electrically connected with the speaker 121, the cable 142 that includes a wire, one end of which is electrically connected with the speaker 122, and the cable 143 includes two wires that extend from the cable 141 and the cable 142, respectively, and are electrically connected with the terminal 130. The cables 141, 142, and 143 include flexible elements in a first area 151, a second area 152, and/or a third area 153.

The flexible elements may be arranged within the insulation members of the cables 141, 142, and 143, respectively. The flexible elements may be arranged to surround different portions of the wires provided in the cables 141, 142, and 143. The flexible elements may be arranged in areas that may be easily found by the user on the cables 141, 142, and 143. For example, the flexible elements may be arranged in the interiors of the first area 151, the second area 152, and the third area 153 that are adjacent to a point where the cables 141, 142, and 143 are branched and merged. As another example, the flexible elements may be arranged in areas in the interiors of the areas that are adjacent to the housings 111 and 112, respectively.

Figure 2:
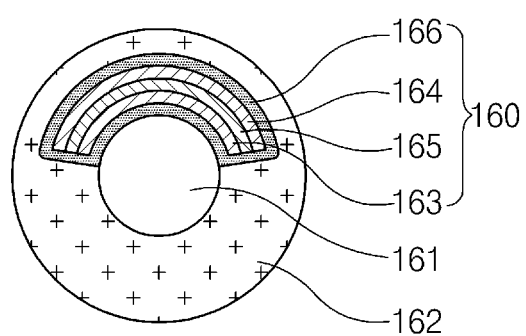
FIG. 2 is a sectional view of the audio output device of FIG. 1, taken along line A-A', according to an embodiment of the present disclosure.

FIG. 2 is a sectional view of the audio output device of FIG. 1, taken along line A-A', according to an embodiment of the present disclosure. Although FIG. 2 illustrates a sectional view of the cable 141, the cables 142 and 143 may also have similar constructions.

Referring to FIG. 2, the cable includes a wire 161, an insulation member 162, and a flexible element 160.

The wire 161 may electrically connect one of the speaker 121 and the terminal 130. The wire 161 may deliver an audio signal provided by the sound source providing device to the speaker 121. The wire 161 may include a flexible conductive material, such as copper.

Although FIG. 1 illustrates that the cable including one wire 161, the present disclosure is not limited thereto and the cable may include a plurality of wires 161.

The insulation member 162 forms the outer sheath of the cable. The insulation member 162 is formed to surround the wire 161 to protect the wire 161.

The flexible element 160 includes a first flexible electrode 163, a second flexible electrode 164, a resilient dielectric 165, and an insulator 166. The flexible element 160 surrounds a portion of the wire 161. For example, the flexible element 160 has an arc shape and surrounds a portion of a circumference of the wire 161. The flexible element 160 may be a capacitive element having a capacitance. The capacitance of the flexible element 160 may change as the flexible element 160 is deformed. The flexible element 160 may be deformed when an external force is applied thereto.

The first flexible electrode 163 is arranged adjacent to the wire 161. The first flexible electrode 163 may have a curved surface that is curved along the wire 161. The first flexible electrode 163 may include a conductor that may be curved by an external force.

The second flexible electrode 164 is arranged parallel to the first flexible electrode 163 and adjacent to the insulation member 162. The second flexible electrode 164 may have a curved surface that is curved in parallel to the first flexible electrode 163. The second flexible electrode 164 may include a conductor that may be curved by an external force. The second flexible electrode 164 may be formed of a material that is the same as that of the first flexible electrode 163.

The resilient dielectric 165 is interposed between the first flexible electrode 163 and the second flexible electrode 164. The resilient dielectric 165 may have a curved surface that is curved in parallel to the first flexible electrode 163 and the second flexible electrode 164. The resilient dielectric 165 may include a resilient body which may be curved by an external force and a thickness of which may change. A distance between the first flexible electrode 163 and the second flexible electrode 164 may change due to the deformation of the resilient dielectric 165. As the distance between the first flexible electrode 163 and the second flexible electrode 164 changes, the capacitance of the flexible element 160 changes.

The insulator 166 covers an outer surface of the first flexible electrode 163, the resilient dielectric 165, and the second flexible electrode 164. The insulator 166 may electrically isolate the first flexible electrode 163, the resilient dielectric 165, and the second flexible electrode 164 from the wire 161. The insulator 166 may include a resilient insulator, such as silicon.

Figure 3:
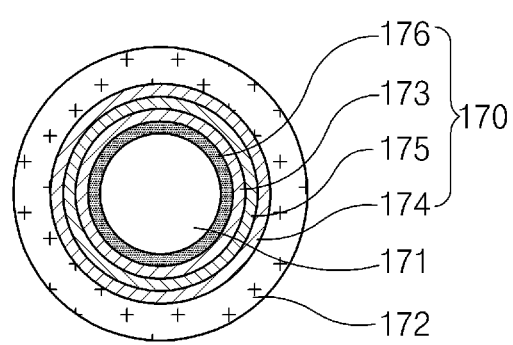
FIG. 3 is a sectional view of the audio output device of FIG. 1, taken along line A-A', according to an embodiment of the present disclosure.

FIG. 3 is a sectional view of the audio output device of FIG. 1, taken along line A-A', according to an embodiment of the present disclosure. Although FIG. 3 illustrates a sectional view of the cable 141, the cables 142 and 143 may also have similar constructions.

Referring to FIG. 3, the cable includes a wire 171, an insulation member 172, and a flexible element 170.

The wire 171 and the insulation member 172 may have the same characteristics as those of the wire 161 and the insulation member 162 of FIG. 2.

The flexible element 170 includes a first flexible electrode 173, a second flexible electrode 174, a resilient dielectric 175, and an insulator 176. The flexible element 170 surrounds a circumference of the wire. For example, the flexible element 170 has an annular shape and surrounds the entire circumference of a circumference of the wire 171. The flexible element 170 may be a capacitive element having a capacitance. The capacitance of the flexible element 170 may change as the flexible element 170 is deformed. The flexible element 170 may be deformed when an external force is applied thereto.

The first flexible electrode 173, the second flexible electrode 174, the resilient dielectric 175, and the insulator 176 surround the entire circumference of the wire. The characteristics of the first flexible electrode 173, the second flexible electrode 174, the resilient dielectric 175, and the insulator 176 may be the same as those of first flexible electrode 163, the second flexible electrode 164, the resilient dielectric 165, and the insulator 166 of FIG. 2, respectively.

Figure 4:
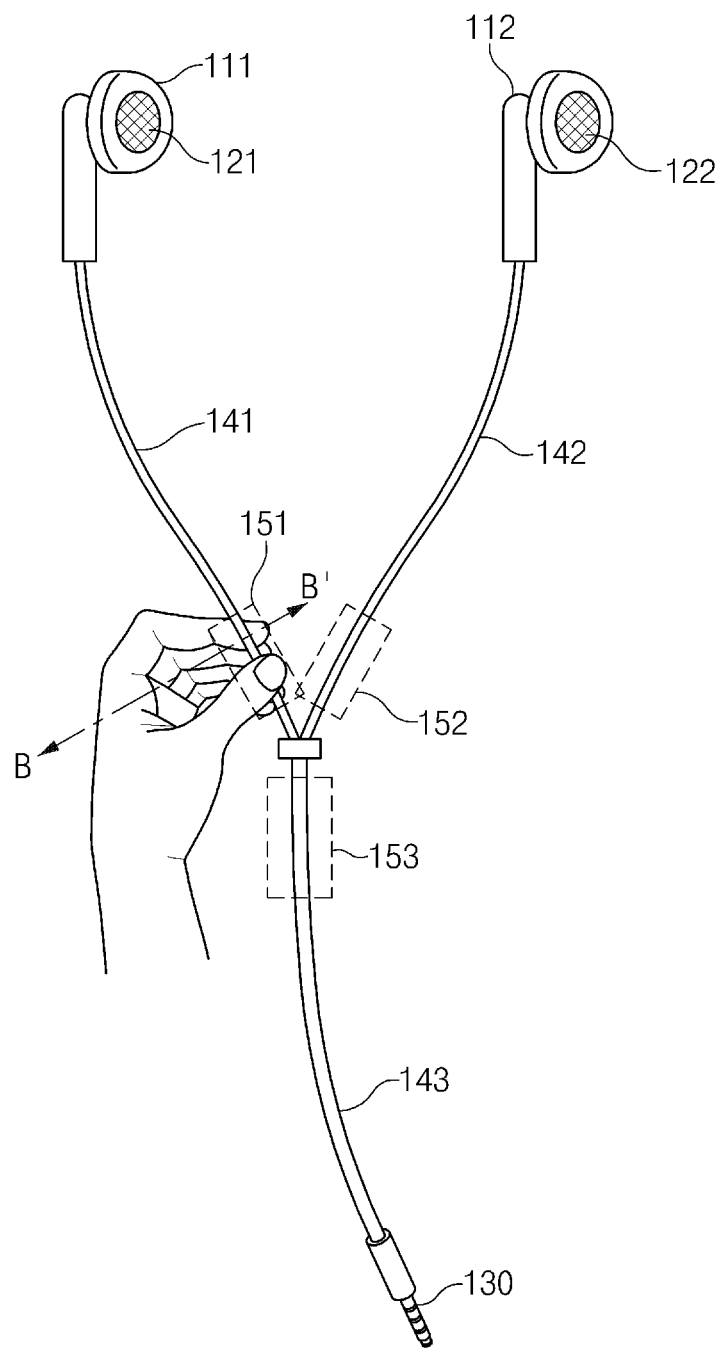
FIG. 4 illustrates a user deforming the audio output device of FIG. 1, according to an embodiment of the present disclosure.

FIG. 4 illustrates a user deforming the audio output device of FIG. 1, according to an embodiment of the present disclosure. Although FIG. 4 illustrates flexible elements in the first area 151 of the cable 141 being deformed, the same operation may also be applied to flexible elements in a second area 152 and/or a third area 153 of the cables 142 and 143.

Figure 5:
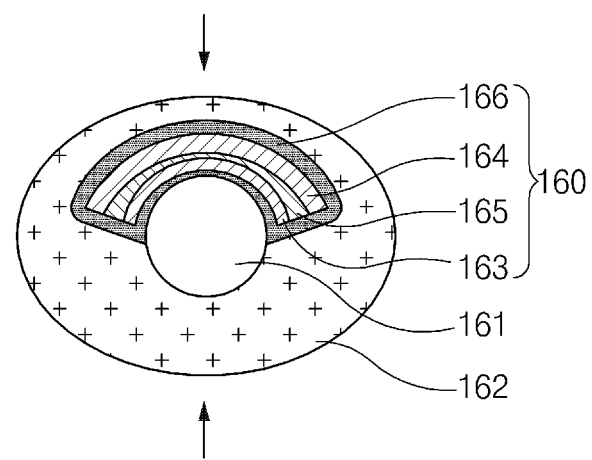
FIG. 5 is a sectional view of the audio output device of FIG. 4, taken along line B-B', according to an embodiment of the present disclosure.

FIG. 5 is a sectional view of the audio output device of FIG. 4, taken along line B-B', according to an embodiment of the present disclosure. For convenience of description, FIG. 5 illustrates the cable configuration of FIG. 2, but the cable configuration of FIG. 3 is also applicable.

Referring to FIGS. 4 and 5, a force generated by the user is applied to cable 141. For example, the cable 141 is deformed by a force applied by a finger of the user. Because a force is applied to the first area 151 of the cable 141, at which the flexible element 160 is provided, the capacitance of the flexible element 160 is deformed, and the capacitance of the flexible element 160 is changed.

Referring to FIG. 5, as the force is applied to the flexible element 160, the flexible element 160 is deformed, such that the thickness of the resilient insulator 166 is changed. A distance between the first flexible electrode 163 and the second flexible electrode 164 changes as the thickness of the resilient insulator 166 changes. If the distance between the first flexible electrode 163 and the second flexible electrode 164 changes, the capacitance of the flexible element 160 changes. For example, if the thickness of the resilient insulator 166 becomes smaller due to the applied force, the capacitance of the flexible element 160 may increase. When a force is applied to the cable 141, the insulation member 162 may be deformed.

Figure 6:
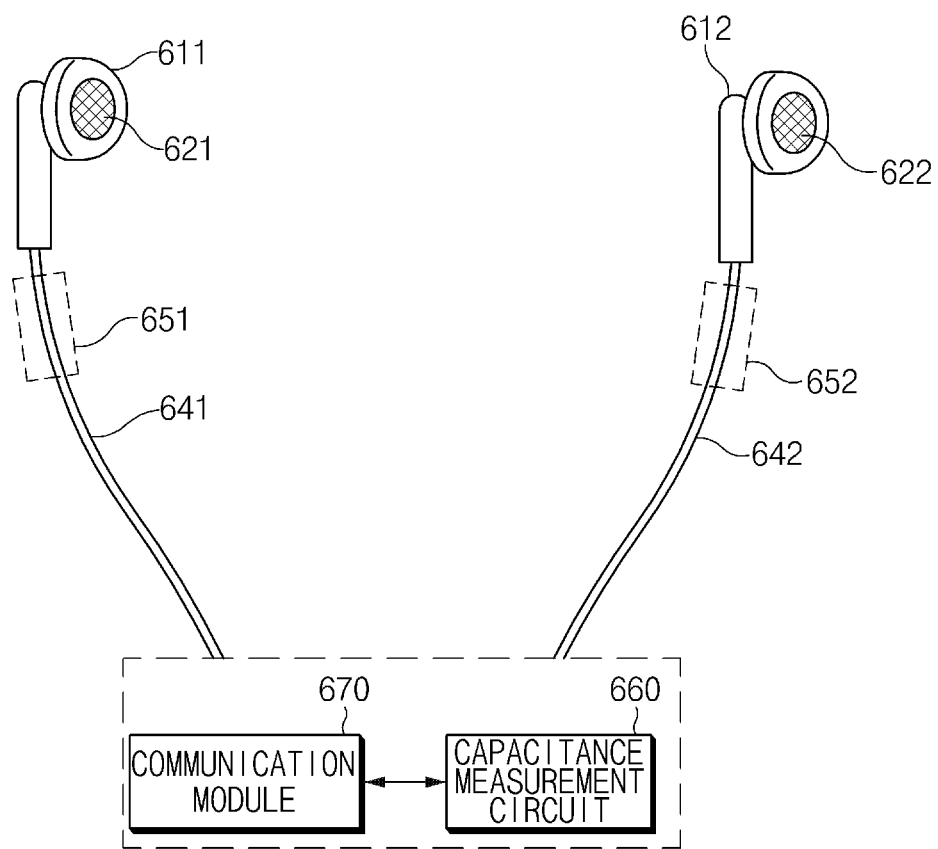
FIG. 6 illustrates an audio output device according to an embodiment of the present disclosure.

FIG. 6 illustrates an audio output device according to an embodiment of the present disclosure.

Referring to FIG. 6, the audio output device includes housings 611 and 612, speakers 621 and 622, and cables 641 and 642, a capacitance measurement circuit 660, and a communication module 670.

The audio output device may wirelessly communicate with a sound source providing device (e.g., an electronic device such as a smartphone or a tablet PC). The audio output device may be a Bluetooth earphone. Although FIG. 1 illustrates that the audio output device as an earphone, the present disclosure is not limited thereto. For example, the audio output device may be one of various audio output devices such as a headphone.

The housings 611 and 612 and the speakers 621 and 622 may have the same configurations as those of the housings 111 and 112 and the speakers 121 and 122 of FIG. 1.

The cables 641 and 642 electrically connect the speakers and the communication module 670. Each of the cables 641 and 642 may include a wire that delivers an electrical signal and an insulation member that forms an outer sheath that surrounds the wire. The cable 641 may include a wire, one end of which is electrically connected with the speaker 621, and the cable 642 may include a wire, one end of which is electrically connected with the speaker 622. The cables 641 and 642 may include flexible elements in the first area 651 and the second area 652, respectively.

The flexible elements may be arranged within the insulation members of the cables 641 and 642, respectively. The flexible elements may be arranged to surround different portions of the wires provided in the cables 641 and 642. The flexible elements may be arranged in areas that may be easily found by the user on the cables 641 and 642. For example, the flexible elements may be arranged in the interiors of the first area 651 that is adjacent to the housing 611 and the second area 652 that is adjacent to the housing 612. The flexible elements may have the same structures as those of the flexible elements 160 and 170 of FIGS. 2 and 3.

The flexible elements may be electrically connected with the capacitance measurement circuit 660.

The capacitance measurement circuit 660 may measure the capacitances of the flexible elements. The capacitance measurement circuit 660 may deliver the measured capacitances to the communication module 670.

The communication module 670 may wirelessly communicate with the sound source providing device. The communication module 670 may communicate with the source providing device using Bluetooth low energy (BLE), Wi-Fi Direct, or near field communication (NFC). The communication module 670 may transmit the capacitance values measured by the capacitance measurement circuit 660 to the sound source providing device. The communication module 670 may receive an audio signal from the sound source providing device. The communication module 670 may deliver the received audio signal to the speakers 621 and 622 through the cables 641 and 642, respectively.

Figure 7:
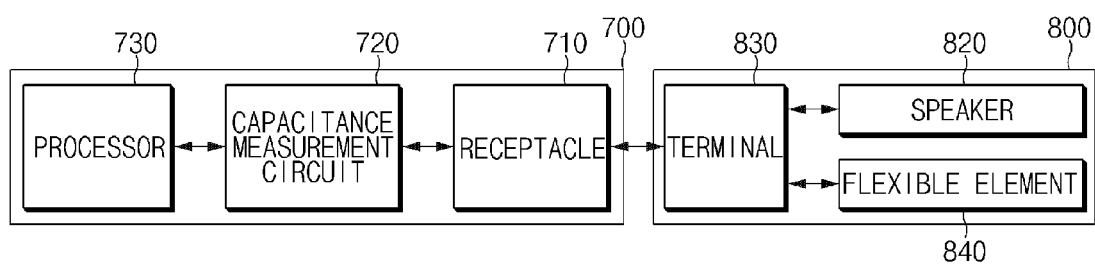
FIG. 7 illustrates a sound source providing device and an audio output device according to an embodiment of the present disclosure.

FIG. 7 illustrates a sound source providing device and an audio output device according to an embodiment of the present disclosure.

Referring to FIG. 7, the sound source providing device 700 includes a receptacle 710, a capacitance measurement circuit 720, and a processor 730.

The audio output device 800 includes a speaker 820, a terminal 830, and a flexible element 840. The audio output device 800 may be the audio output device that has been described with reference to FIG. 1. Further, the speaker 820, the terminal 830, and the flexible element 840 may be the speaker 121 and 122, the terminal 130, and the flexible element 160 and 170 that have been described with reference to FIGS. 1 to 3.

The sound source providing device 700 may be electrically connected with the audio output device 800. The sound source providing device 700 may provide audio to the audio output device 800. The sound source providing device 700 may detect a change in the capacitance of the flexible element 840 provided in the audio output device 800 and perform a function corresponding to the change in the capacitance. The sound source providing device 700 may be a smartphone, a tablet PC, a wearable device, etc.

The receptacle 710 may be configured to receive a terminal of the audio output device 800. The receptacle 710 may be a 3.5μ jack, an m-USB (micro-USB) port, or a USB-C (USB 3.1 type-C) port that may receive a plug of an earphone or a headphone. The receptacle 710 may include one or more contact units that may electrically contact the terminal 830 received in the receptacle 710.

The capacitance measurement circuit 720 may measure a capacitance of the flexible element 840 electrically connected thereto through the receptacle 710. The flexible measurement circuit 720 may be electrically connected with the flexible element 840. The capacitance measurement circuit 720 may measure a capacitance due to two flexible electrodes provided in the flexible element 840. The capacitance measurement circuit 720 may include a bridge circuit for measuring a capacitance.

The processor 730 may be electrically connected with the capacitance measurement circuit 720. The processor 730 may perform various operations based on the capacitor measured by the capacitance measurement circuit 720.

The processor 730 may obtain a capacitance that changes as the shape of the flexible element 840 changes, by using the capacitance measurement circuit 720. The processor 730 may consistently obtain the capacitance of the flexible element 840. The capacitance obtained by the processor 730 may change as the shape of the flexible element 840 changes. When a plurality of flexible elements 840 are provided in the audio output device 800, the processor 730 may individually obtain the capacitances of the plurality of flexible elements 840.

The processor 730 may execute a function that is mapped with the obtained capacitance. The processor 730 may determine the function based on at least one of a magnitude, a change level, a change time, and/or a change pattern of the capacitance. For example, the processor 730 may execute the function mapped with the magnitude of the capacitance if the magnitude of the capacitance falls within a specific range. As another example, the processor 730 may execute the function mapped with the change level of the capacitance if the change level of the capacitance falls within a specific range. The magnitude and change level of the capacitance may be associated with a magnitude of an external force applied to the flexible element 840.

As another example, the processor 730 may execute a function mapped with the corresponding time of the capacitance if the capacitance changes for the specific time.

As another example, the processor 730 may execute a function mapped with the pattern of the capacitance if the capacitance changes a specific number of times at a specific time interval.

When a plurality of flexible elements 840 are provided in the audio output device 800 and the capacitance of one of the plurality of flexible elements 840 has changed, the processor 730 may determine a corresponding function. For example, when the audio output device 800 includes a first flexible element, a second flexible element, and a third flexible element, the processor 730 may execute different functions based on the capacitance of which one of the three flexible elements has changed.

The processor 730 may execute a volume control function, a playback function, a stop function, a rewind function, a fast forward function, a call connecting function, a call ending function, and/or an application execution function.

For example, the audio output device 800 may include a first flexible element in the first area 151 of FIG. 1, may include a second flexible element in the second area 152 of FIG. 1, and may include a third flexible element in the third area 153 of FIG. 1. The processor 730 may decrease volume if the capacitance of the first flexible element changes for not more than 0.5 seconds. The processor 730 may increase volume if the capacitance of the second flexible element changes for not more than 0.5 seconds. The processor 730 may play a sound source if the capacitance of the third flexible element changes for not more than 0.5 seconds while the play of the sound source is stopped. The processor 730 may stop the playback a sound source if the capacitance of the third flexible element changes for not more than 0.5 seconds while the sound source is played. The processor 730 may rewind a sound source if the capacitance of the first flexible element changes for not less than 1 seconds while the sound source is played. The processor 730 may fast forward a sound source if the capacitance of the second flexible element changes for not less than 1 second while the sound source is played. The processor 730 may connect a call if the capacitance of the third flexible element changes for not more than 0.5 seconds when a call is requested from the outside. The processor 730 may end a call if the capacitance of the third flexible element changes for not more than 0.5 seconds during a call. The processor 730 may execute a music playback application if the capacitance of the third flexible element changes three times in one second.

In addition, various functions may be mapped based on the magnitude, the change level, the change time, the change pattern of the capacitance, or the type of the flexible element, of which the capacitance has changed.

Although not illustrated in FIG. 7, the processor 730 may be electrically connected with the receptacle 710, and may provide a sound source to the audio output device 800 through the receptacle 710.

Figure 8:
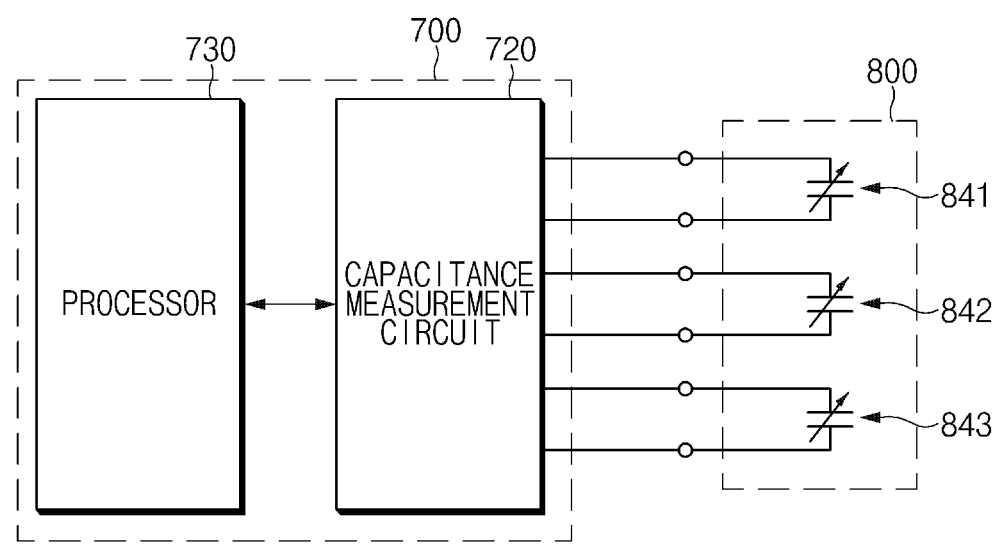
FIG. 8 illustrates a connection of a sound source providing device and a flexible element provided in an audio output device according to an embodiment of the present disclosure.

FIG. 8 illustrates a connection of a sound source providing device and a flexible element provided in an audio output device according to an embodiment of the present disclosure.

Referring to FIG. 8, the capacitance measurement circuit 720 provided in the sound source providing device 700 may be connected with a first flexible element 841, a second flexible element 842, and a third flexible element 843 that are provided in the audio output device 800.

When the audio output device 800 includes the plurality of flexible elements 841, 842, and 843, the capacitance measurement circuit 720 may measure the capacitances of the plurality of flexible elements 841, 842, and 843 through different electrical paths. The plurality of flexible elements 841, 842, and 843 may be connected with the sound providing device 700 through different electrical paths. The capacitances of the plurality of flexible elements 841, 842, and 843 may be measured separately.

The processor 730 may obtain information on one of the plurality of flexible elements 841, 842, and 843, of which the capacitance has changed. The processor 730 may distinguish one of the plurality of flexible elements 841, 842, and 843, of which the capacitance has changed. The processor 730 may execute a function mapped with the flexible element and the capacitance of the flexible element. For example, the processor 730 may execute a first application if the capacitance of the first flexible element 841 changes, may play a sound source if the capacitance of the second flexible element 842 changes, and may end a call if the capacitance of the third flexible element 843 changes. Further, the processor 730 may execute different functions based on the magnitude of the capacitances, the change levels, the change times, and/or the change patterns of the first flexible element 841, the second flexible element 842, and the third flexible element 843.

Figure 9:
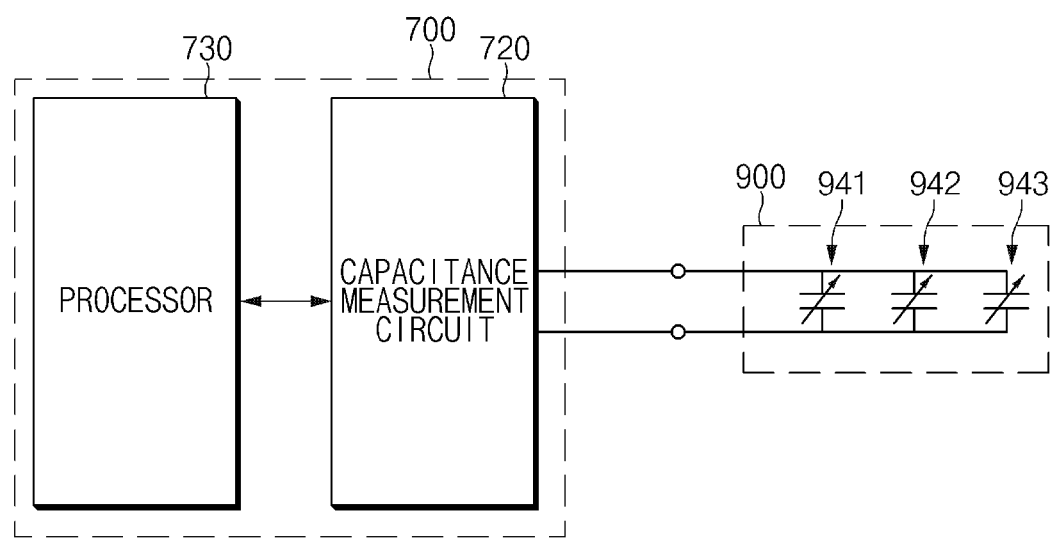
FIG. 9 illustrates a connection of a sound source providing device and a flexible element provided in an audio output device according to an embodiment of the present disclosure.

FIG. 9 illustrates a connection of a sound providing device and flexible elements provided in an audio output device according to an embodiment of the present disclosure.

Referring to FIG. 9, the capacitance measurement circuit 720 of the sound providing device 700 may be connected with a first flexible element 941, a second flexible element 942, and a third flexible element 943 of the audio output device 900.

When the audio output device 900 includes a plurality of flexible elements 941, 942, and 943, of which the change levels of the capacitances due to a change in the shape of the audio output device 900 are different, the capacitances of the plurality of flexible elements 941, 942, and 943 may be measured through the same electrical path. The plurality of flexible elements 941, 942, and 943 may be connected in parallel to the sound source providing device 700 through the same electrical path. The change levels of the capacitances of the plurality of flexible elements 941, 942, and 943 due to the change of the shape of the audio output device 900 may be different.

The processor 730 may distinguish one of the plurality of flexible elements 941, 942, and 943, of which the capacitance has changed based on the change level of the capacitance. When the change levels of the capacitances of the plurality of flexible elements 941, 942, and 943 due to the change of the shape of the audio output device 900 are different, when the shape of the first flexible element 941 has changed, when the shape of the second flexible element 942 has changed, and when the shape of the third flexible element 943 has changed, the magnitude or the change level of the synthesized capacitance of the plurality of flexible elements 941, 942, and 943 may be different. Accordingly, the processor 730 may determine that the capacitance of the first flexible element 941 has changed when the magnitude of the synthesized capacitance falls within a first range, may determine that the capacitance of the second flexible element 942 has changed when the magnitude of the synthetized capacitance falls within a second range, and may determine that the capacitance of the third flexible element 942 has changed when the magnitude of the synthetized capacitance falls within a third range. The processor 730 may execute different functions based on the magnitude of the synthesized capacitance. For example, the first processor 730 may execute a first application if the synthesized capacitance changes to the first range, may play a sound source if the synthesized capacitance changes to the second range, and may end a call if the synthesized capacitance changes to the third range. Further, the processor 730 may execute different functions based on the change time or change pattern of the synthesized capacitance.

Figure 10:
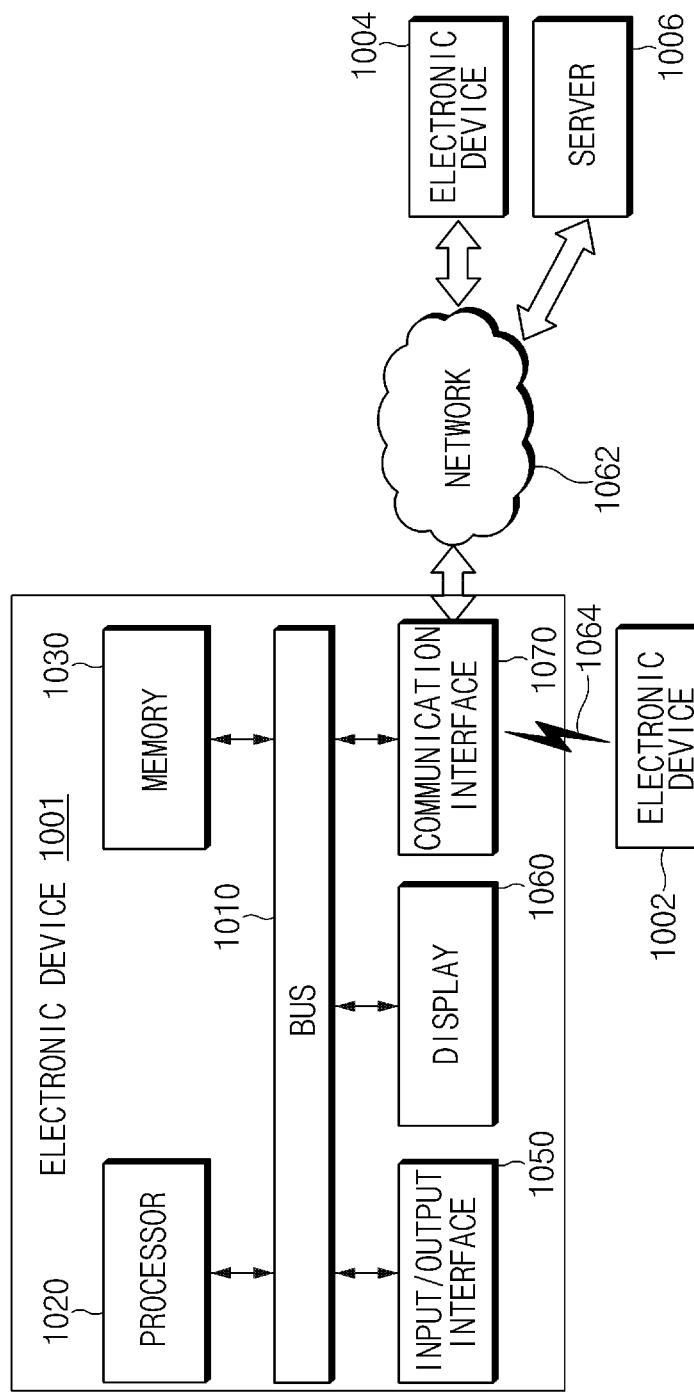
FIG. 10 illustrates an electronic device in a network environment according to an embodiment of the present disclosure.

FIG. 10 illustrates an electronic device in a network environment according to an embodiment of the present disclosure.

Referring to FIG. 10, the electronic devices 1001, 1002, and 1004 and/or a server 1006 may be connected to each other through a network 1062 and/or a short range communication 1064.

The electronic device 1001 includes a bus 1010, a processor 1020, a memory 1030, an input/output interface 1050, a display 1060, and a communication interface 1070. Alternatively, the electronic device 1001 may exclude at least one of the elements or may additionally include another element.

The bus 1010 may include a circuit that connects the components 1010 to 1070 and transfers communications (e.g., control messages and/or data) between the components.

The processor 1020 may include one or more of a CPU, an application processor (AP), or a communication processor (CP). The processor 1020 may execute operations or data processing related to the control and/or communication of at least one other component of the electronic device 1001.

The input/output interface 1050 may transfer a command or data that are input from the user or another external device to another element (other elements) of the electronic device 1001. The input/output interface 1050 may output commands or data received from another component(s) of the electronic device 1001 to the user or anther external device.

Figure 11:
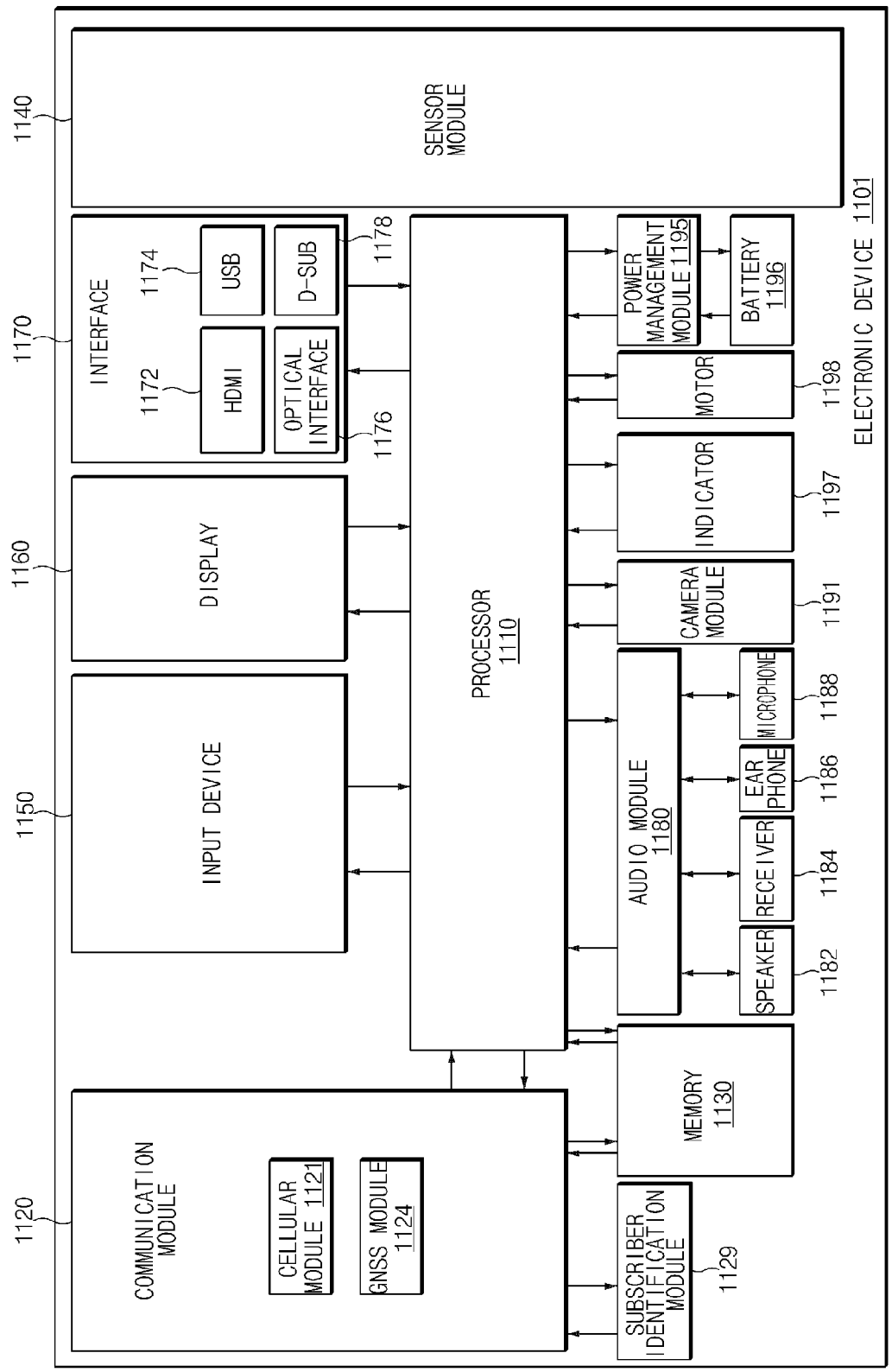
FIG. 11 illustrates an electronic device according to various embodiments of the present disclosure.

FIG. 11 illustrates an electronic device according to an embodiment of the present disclosure.

Referring to FIG. 11, an electronic device 1101 includes a processor 1110, a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may control a plurality of hardware or software components connected to the processor 1110 by driving an operating system (OS) or an application program and perform a variety of data processing and calculations. The processor 1110 may be implemented by a system on chip (SoC). The processor 1110 may further include a graphical processing unit (GPU) and/or an image signal processor. The processor 1110 may include at least some of the components illustrated in FIG. 11 (e.g., a cellular module 1121). The processor 1110 may load instructions or data, received from at least one other component (e.g., a non-volatile memory), in a volatile memory to process the loaded instructions or data, and may store various types of data in a non-volatile memory.

The interface 1170 may include a high-definition multimedia interface (HDMI) 1172, a universal serial bus (USB) 1174, an optical interface 1176, and a D-subminiature (D-sub) 1178. Additionally or alternatively, the interface 1170 may include a mobile high-definition link (MHL) interface, a secure digital (SD) card/multimedia card (MMC) interface, and/or an infrared data association (IrDA) standard interface.

The audio module 1180 may bilaterally convert a sound and an electrical signal. The audio module 1180 may process sound information input or output through a speaker 1182, a receiver 1184, earphones 1186, a microphone 1188, etc.

Each of the elements described in the specification may include one or more components, and the terms of the elements may be changed according to the type of the electronic device. In various embodiments, the electronic device may include at least one of the elements described in the specification, and some elements may be omitted or additional elements may be further included. Some of the elements of the electronic device according to various embodiments may be coupled to form one entity, and may perform the same functions of the corresponding elements before they are coupled.

Herein, the term "module" may mean a unit including hardware, software, and/or firmware. The term "module" may be interchangeably used with "unit", "logic", "logical block", "component", or "circuit". A module may be a minimum unit or a part of an integrally configured part. A module may be a minimum unit or a part which performs one or more functions. A module may be implemented mechanically or electromagnetically. For example, a module may include at least one of an application-specific integrated circuit (ASIC) chip, a field-programmable gate array, or a programmable-logic device, which has been known, will be developed in the future, or performs certain operations.

At least some of the devices (e.g., modules or functions) or methods (e.g., operations) according to various embodiments of the present disclosure may be implemented by an instruction stored in a computer-readable storage medium, for example, in the form of a program module. When the instruction is executed by the processor (e.g., the processor 1020), the processor may perform a function corresponding to the instruction. The computer-readable storage medium may be, for example, the memory 1030.

The computer-readable storage medium may include a hard disk, a floppy disk, a magnetic medium (e.g., a magnetic tape), an optical medium (e.g., a compact disk read only memory (CD-ROM)), a DVD, a magneto-optical medium (e.g., a floptical disk), a hardware device (e.g., a read only memory (ROM), a random access memory (RAM), or a flash memory). Further, the program instruction may include high-level language codes which may be executed by a computer using an interpreter as well as machine languages created by using a compiler. The above-mentioned hardware device may be configured to be operated as one or more software module to perform operations of various embodiments, and the converse is applied.

The module or program module according to various embodiments may include at least one of the above-mentioned elements, omit some of them, or further include other elements. The module, the program module, or the operations performed by other elements according to various embodiments may be performed in a sequential, parallel, iterative, or heuristic method. Further, some operations may be executed in another sequence or may be omitted, or other operations may be added.

According to various embodiments of the present disclosure, an aesthetic aspect of an audio output device may be improved by arranging flexible elements for controlling a sound source providing device in an interior of a cable.

Further, the convenience of the manipulation of the audio output device may be improved by arranging the flexible elements at various locations that may be easily found by the user.

In addition, the present disclosure may provide various effects that are directly or indirectly recognized.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An audio output device comprising:
   a plurality of speakers;
   a terminal electrically connected with a sound source providing device; and
   a cable connecting the plurality of speakers and the terminal,
   wherein the cable comprises:
      a wire;
      a flexible element surrounding a portion of the wire; and
      an insulation member forming an outer sheath of the cable,
   wherein the flexible element comprises:
      a first flexible electrode electrically connected to the terminal and disposed closer to the wire than the insulation member;
      a second flexible electrode electrically connected to the terminal and disposed closer to the insulation member than the wire;
      a resilient dielectric interposed between the first flexible electrode and the second flexible electrode; and
      an insulator forming an outer sheath of the flexible element by covering outer surfaces of the flexible element,
   wherein the flexible element has an arc shape surrounding a portion of a circumference of the wire, and
   wherein a capacitance of the flexible element changes as the flexible element is deformed.

2. The audio output device of claim 1, wherein the flexible element is configured to be deformed by an external force.

3. The audio output device of claim 1, wherein the first flexible electrode is arranged adjacent to the wire, and wherein the second flexible electrode is arranged parallel to the first flexible electrode.

4. The audio output device of claim 1, wherein the flexible element further comprises a plurality of flexible elements that surround different portions of the wire, and
   wherein the plurality of flexible elements are electrically connected with the terminal through different electrical paths, respectively.

5. The audio output device of claim 1, wherein the flexible element further comprises a plurality of flexible elements that surround different portions of the wire, and
   wherein changes in capacitances of the plurality of flexible elements, in response to deforming the plurality of flexible elements, are different from each other.

6. An audio output device comprising:
   a plurality of speakers;
   a cable comprising:
      a wire that is electrically connected with the plurality of speakers;
      a flexible element that surrounds a portion of the wire; and
      an insulation member that forms an outer sheath of the cable;
   a capacitance measurement circuit electrically connected with the flexible element and configured to measure a capacitance of the flexible element; and
   a communication module configured to transmit the capacitance measured by the capacitance measurement circuit to a sound source providing device,
   wherein the flexible element comprises:
      a first flexible electrode electrically connected to the capacitance measurement circuit and disposed closer to the wire than the insulation member;
      a second flexible electrode electrically connected to the capacitance measurement circuit and disposed closer to the insulation member than the wire;
      a resilient dielectric interposed between the first flexible electrode and the second flexible electrode; and
      an insulator forming an outer sheath of the flexible element by covering outer surfaces of the flexible element,
   wherein the flexible element has an arc shape surrounding a portion of a circumference of the wire, and
   wherein the capacitance of the flexible element changes as the flexible element is deformed.

7. The audio output device of claim 6, wherein the flexible element is configured to be deformed by an external force.

8. The audio output device of claim 6, wherein the first flexible electrode is arranged adjacent to the wire, and
   wherein the second flexible electrode is arranged parallel to the first flexible electrode.

9. The audio output device of claim 6, wherein the flexible element comprises a plurality of flexible elements that surround different portions of the wire, and
   wherein the plurality of flexible elements are electrically connected with the capacitance measurement circuit through different electrical paths, respectively.

10. The audio output device of claim 6, wherein the flexible element comprises a plurality of flexible elements that surround different portions of the wire, and
    wherein changes in capacitances of the plurality of flexible elements, in response to deforming the plurality of flexible elements, are different from each other.

* * * * *